United States Patent [19]
Peters et al.

[11] Patent Number: 5,357,708
[45] Date of Patent: Oct. 25, 1994

[54] AQUATIC TRAP

[76] Inventors: Richard F. Peters, 421 Creamery Rd., Hinsdale, Mass. 01235; Steven R. Peters, 36 Phillip Dr., Oxford, Pa. 19363

[21] Appl. No.: 103,586
[22] Filed: Aug. 9, 1993
[51] Int. Cl.⁵ .............................................. A01K 69/00
[52] U.S. Cl. ...................................................... 43/100
[58] Field of Search ................ 43/100, 102, 103, 104, 43/105, 61, 64, 65, 66

[56]  References Cited

U.S. PATENT DOCUMENTS

| | | | |
|---|---|---|---|
| D. 269,109 | 5/1983 | Morton | D22/18 |
| 2,516,658 | 7/1950 | Stelly | 43/100 |
| 2,530,449 | 11/1950 | Bush | 43/102 |
| 2,769,274 | 11/1956 | Ougland | 43/65 |
| 3,748,776 | 7/1973 | Mueller | 43/105 |
| 3,800,464 | 4/1974 | Parker | 43/100 |
| 3,800,465 | 4/1974 | Rea | 43/105 |
| 3,821,861 | 7/1974 | Jalbert | 43/100 |
| 3,906,654 | 9/1975 | Leslie | 43/100 |
| 4,070,788 | 1/1978 | Richcreek | 43/100 |
| 4,843,756 | 7/1989 | Wyman et al. | 43/102 |
| 4,979,328 | 12/1990 | Poupore | 43/100 |
| 5,131,184 | 7/1992 | Harrison | 43/100 |

Primary Examiner—P. Austin Bradley
Assistant Examiner—Chuck Y. Mah
Attorney, Agent, or Firm—Rhodes & Ascolillo

[57] ABSTRACT

An aquatic trap, the aquatic trap including a chamber, the chamber being bounded by a netted periphery that is permeable by water, at least one inlet passing through the netted periphery, the inlet converging toward the interior of the chamber, a rotatable wall portion formed in the netted periphery, the rotatable wall portion being connected to the netted periphery by a pivotal connection, the rotatable wall portion being rotatable about the pivotal connection from a closed position in which the rotatable wall portion is substantially within the plane of the netted periphery to an open position in which the rotatable wall portion is substantially outside of the plane of the netted periphery, a biasing mechanism for biasing the rotatable wall portion toward the closed position, and a stop mechanism for abutting the rotatable wall portion in the closed position against the biasing action of the biasing mechanism.

5 Claims, 3 Drawing Sheets

AQUATIC TRAP

BACKGROUND

1. Field of the Invention

The present invention relates to the field of aquatic traps, most specifically, those designed for the trapping of bait fish, such as shiners, minnows, and other aquatic life.

2. Description of the Related Art

U.S. Pat. No. 4,979,328 relates to a trap for small fish that includes annular top and bottom panels and a peripheral side panel extending therebetween about a substantial portion of the periphery, the ends of the side panel being directed inward from the peripheral edges to define an opening.

U.S. Pat. No. 4,843,756 relates to an entrance gate for fish and crab traps that includes a rectangular frame to which is attached a plurality of flexible plastic finger assemblies which collectively form a converging passageway into the trap.

U.S. Pat. No. 3,800,465 relates to a fish and crab trap that includes a basket having a resilient mouth, a cable attached to the basket near the mouth and an anchor likewise attached to the basket near the mouth but substantially opposite the cable attachment.

U.S. Pat. No. 3,748,776 relates to a fish and bait trap that floats and that includes a cylindrical cage within which fish may live when trapped, a shelter having spaced floats being superimposed over the cage in journaled relationship therewith allowing the cage to be rotated relative to the shelter.

Design U.S. Pat. No. 269,109 discloses an ornamental design for a fish trap.

SUMMARY OF THE INVENTION

In many conventional aquatic traps, the bait fish or other aquatic life trapped therein can only be removed by at least partially disassembling the trap. Often two separate portions of the trap are held together by clips that must be removed to allow access to the contents. This can be a time consuming and frustrating operation.

One object of the present invention is the provision of an aquatic trap that allows the contents thereof to be quickly and easily removed therefrom, without requiring any disassembly of the trap.

Another object of the invention is the provision of such a trap that is simple in operation and construction, thereby allowing it to be inexpensively manufactured from readily available materials.

In one aspect, the invention generally features an aquatic trap, the aquatic trap including: a chamber; the chamber being bounded by a netted periphery that is permeable by water; at least one inlet passing through the netted periphery, the inlet converging toward the interior of the chamber; and a rotatable wall portion formed in the netted periphery, the rotatable wall portion being connected to the netted periphery by a pivotal connection.

Preferably, the rotatable wall portion is rotatable about the pivotal connection from a closed position in which the rotatable wall portion is substantially within the plane of the netted periphery to an open position in which the rotatable wall portion is substantially outside of the plane of the netted periphery; the aquatic trap additionally includes a biasing mechanism for biasing the rotatable wall portion toward the closed position; the aquatic trap additionally includes a frame extending about the chamber and supporting the netted periphery; the chamber is oblong in shape, and the frame includes: a pair of end frames; and a plurality of elongated side rods interconnecting the pair of end frames; the rotatable wall portion includes a rotatable door disposed adjacent to one of the end frames, and the biasing mechanism includes: a cantilevered beam member projecting outward beyond the netted periphery adjacent the one end frame; and a spring member extending between the cantilevered beam member and the rotatable door; the aquatic trap additionally includes a stop mechanism for abutting the rotatable door in the closed position against the biasing action of the biasing mechanism; the stop mechanism includes at least one cross member disposed across the one end frame; the chamber is substantially rectangular in cross section, each of the pair of end frames is substantially rectangular, the inlet is disposed within the rotatable door, the inlet includes a substantially circular loop formed in the rotatable door and a substantially conical netted surface projecting toward the interior of the chamber therefrom, and the stop mechanism includes a pair of cross members disposed across the one end frame; and the aquatic trap additionally includes a second inlet, the second inlet including a substantially circular loop formed in the other of the pair of end frames and a substantially conical netted surface projecting toward the interior of the chamber therefrom, and a handle for being grasped by an individual disposed on the netted periphery.

In another aspect, the invention generally features an aquatic trap, the aquatic trap including: a chamber; the chamber being bounded by a netted periphery that is permeable by water; at least one inlet passing through the netted periphery, the inlet converging toward the interior of the chamber; a rotatable wall portion formed in the netted periphery, the rotatable wall portion being connected to the netted periphery by a pivotal connection; the rotatable wall portion being rotatable about the pivotal connection from a closed position in which the rotatable wall portion is substantially within the plane of the netted periphery to an open position in which the rotatable wall portion is substantially outside of the plane of the netted periphery; a biasing mechanism for biasing the rotatable wall portion toward the closed position; and a stop mechanism for abutting the rotatable wall portion in the closed position against the biasing action of the biasing mechanism.

Preferably, the chamber is substantially oblong in shape; the aquatic trap additionally includes a pair of end panels and a circumferential side wall extending between the pair of end panels, the rotatable wall portion includes a rotatable door positioned adjacent to one of the pair of end panels, and the stop mechanism includes a pair of cross members attached to the netted periphery and extending across the one end panel; the aquatic trap additionally includes a rectilinear frame supporting the netted periphery, the rectilinear frame including a plurality of elongated rod members; and the pivotal connection includes a plurality of wire loops.

In yet another aspect, the invention generally features an aquatic trap, the aquatic trap including: a chamber; the chamber being bounded by a netted periphery that is permeable by water; at least one inlet passing through the netted periphery, the inlet converging toward the interior of the chamber; a rotatable wall portion formed in the netted periphery, the rotatable wall portion being connected to the netted periphery by a pivotal connection; the rotatable wall portion being rotatable about the pivotal connection from a closed position in which the rotatable wall portion is substantially within the plane of the netted periphery to an open position in which the rotatable wall portion is substantially outside of the plane of the netted periphery; a biasing mechanism for biasing the rotatable wall portion toward the closed position; the chamber being oblong in shape; a frame extending about the chamber and supporting the netted periphery; the frame including: a pair of end frames; and a plurality of elongated side rods interconnecting the pair of end frames; the rotatable wall portion including a rotatable door positioned against one of the pair of end flames; the biasing mechanism including: a cantilevered beam member projecting outward beyond the netted periphery adjacent the one end frame; and a spring member extending between the cantilevered beam member and the rotatable door; and a stop mechanism for abutting the rotatable door in the closed position against the biasing action of the biasing mechanism; the chamber being substantially rectangular in cross section; each of the pair of end frames being substantially rectangular; the inlet being disposed within the rotatable door; the inlet including a substantially circular loop formed in the rotatable door and a substantially conical netted surface projecting toward the interior of the chamber therefrom; and the stop mechanism including a pair of cross members disposed across the rotatable door.

Preferably, the aquatic trap additionally includes a second inlet, the second inlet including a substantially circular loop formed in the other of the pair of end frames and a substantially conical netted surface projecting toward the interior of the chamber therefrom; and the aquatic trap additionally includes a handle for being grasped by an individual provided on the netted periphery.

The invention will now be described by way of a particularly preferred embodiment, reference being made to the accompanying drawings, wherein:

DESCRIPTION OF THE PREFERRED EMBODIMENT

Figure 1:
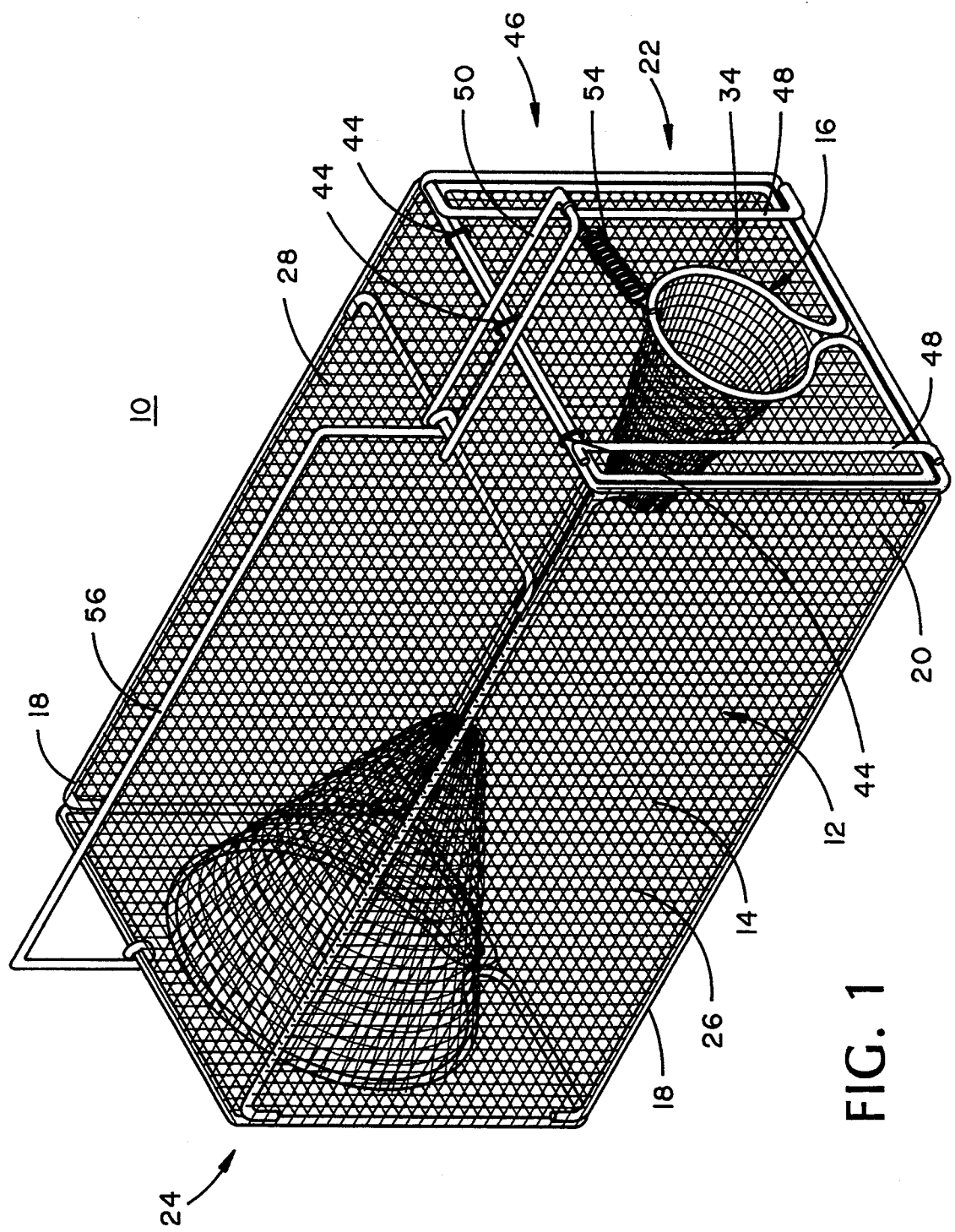
FIG. 1 is a perspective view of an aquatic trap constructed according to the present invention.
Figure 2:
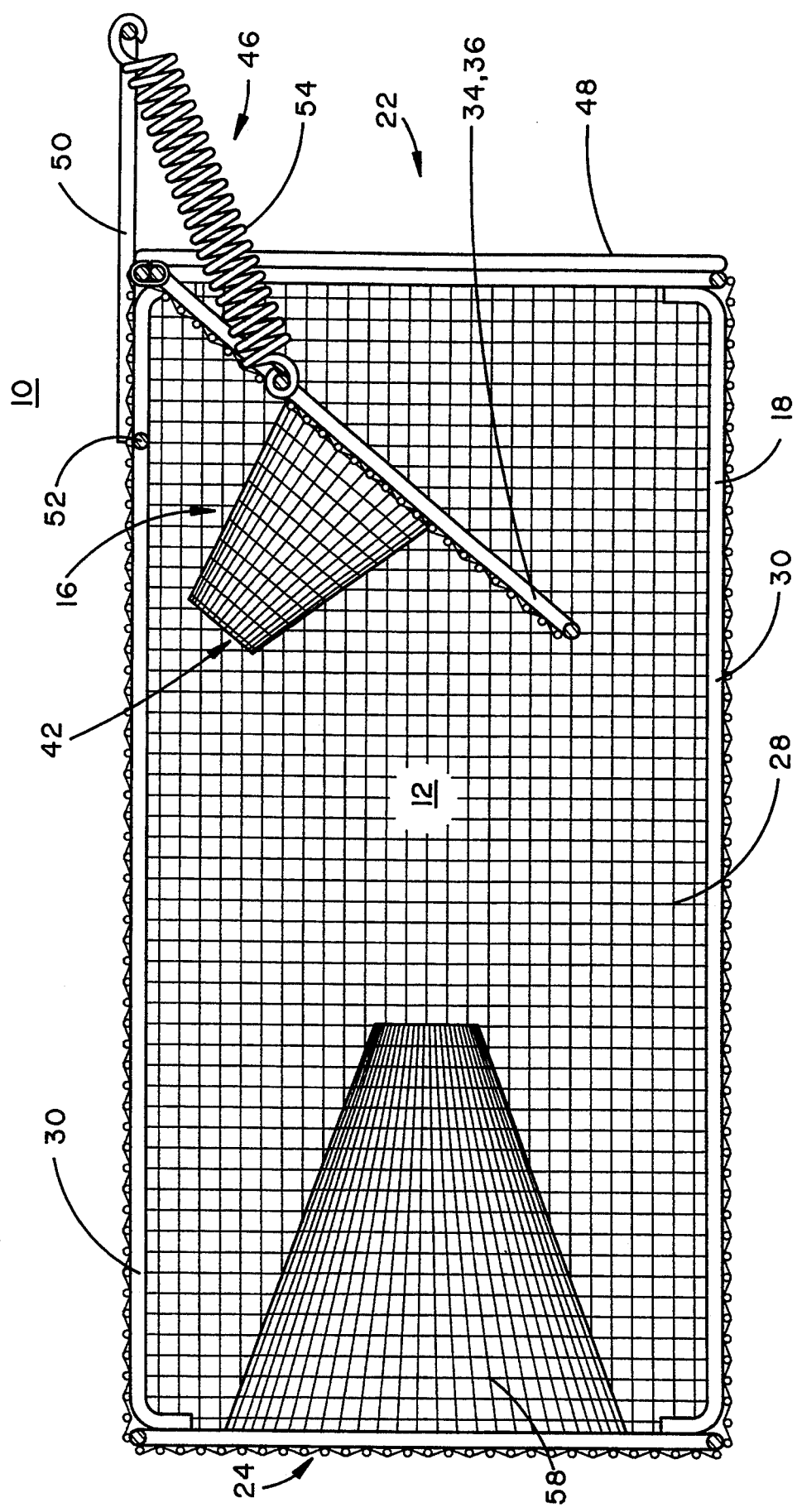
FIG. 2 is a cross sectional view through the inventive aquatic trap of FIG. 1.

Referring initially now to FIGS. 1 and 2, an aquatic trap 10 constructed according to the present invention generally includes an elongated chamber 12 that is substantially bounded on all sides by a netted periphery 14, with at least one inlet 16 being formed in the netted periphery 14 that serves as an entry for the fish, etc. into the chamber 12.

Figure 3:
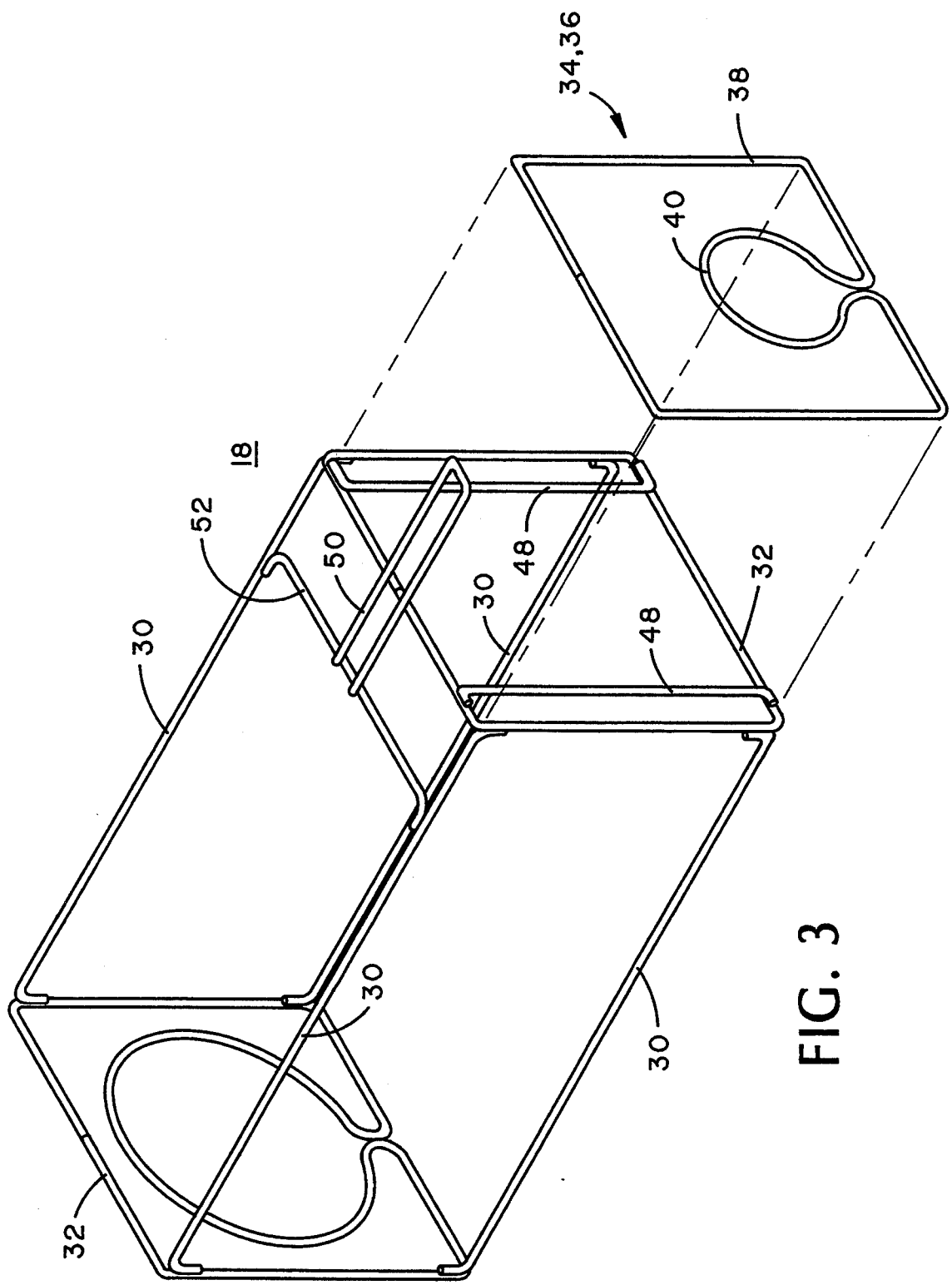
FIG. 3 is a perspective view of the frame of the inventive aquatic trap, minus the net covering thereof, thereby better illustrating details of the frame's construction.

Preferably, the chamber 12 is elongated (or oblong), as shown, and even more preferably, the chamber 12 is rhomboidal (or box like) in shape, and includes a frame structure 18 supporting a netting material 20 that is permeable to water. The frame structure 18, the netting material 20, and the chamber 12 preferably define two end panels 22 and 24 and a circumferential side wall 26 extending between the two end panels 22 and 24, the end panels 22 and 24 preferably being of rectangular shape, when viewed in plan, and the circumferential side wall 26 preferably being made up of four rectangular side walls 28. The frame structure 18, which is most clearly seen in FIG. 3, includes four side rods 30 that extend the length of the chamber 12, and fixedly interconnect (e.g., by welding) two substantially rectangular end frames 32.

To allow the trapped fish, etc. to be easily removed from the chamber 12, a portion of the netted periphery 14 forms a rotatable wall portion 34 that can be rotated out of the plane of the netted periphery 14. In the preferred embodiment illustrated, a rectangular door 36 that is of substantially the same dimensions as one of the end frames 32, and that is substantially aligned therewith forms the rotatable wall portion 34. As seen most clearly in FIG. 3, the rotatable door 36 includes a generally rectangular rim 38 constructed of the frame material, the rim 38 also having an integral and substantially circular loop portion 40 projecting toward the center thereof. The loop portion 40, together with a substantially conical net portion 42 that projects toward the interior of the chamber 12 constitutes the inlet 16. The rotatable door 36, which includes the inlet 16, is pivotally attached to the frame structure 18 by rings 44 that encircle a portion of both the end frame 32 and the rim 38.

In view of the above-described construction, the rotatable door 36 can be swung inward, as shown in FIG. 2, to allow access to the chamber 12. The rotatable door 36 is biased outward, however, by a biasing mechanism 46, described more fully below, into abutment with a pair of stop rods 48 that are attached (e.g., by welding) to the end frame 32 and that extend across the rotatable door 36, thereby preventing it from swinging outward beyond the netted periphery 14.

The biasing mechanism 46 generally includes a cantilevered beam member 50 that projects over and beyond the rotatable door 36, the cantilevered beam member 50 preferably being of an elongated U-shape and of the same material as the frame structure 18. The cantilevered beam member 50 is preferably attached to an interior cross member 52 that extends between two of the side rods 30, and a coil spring 54 interconnects the distal end of the cantilevered beam member 50 with the rotatable door 36, preferably connecting to the circular loop portion 40 thereof and thus urging the rotatable door 36 against the pair of stop rods 48.

The aquatic trap 10 may preferably be provided with a handle 56, shown in FIG. 1, that is connected between the interior cross member 52 and the other (i.e., the nonrotatable) end frame 32. Additionally, a second inlet 58 may be provided, for example, in the other end frame 32.

While the invention has been herein described by way of a particular preferred embodiment, various substitutions of equivalents may be effected without departing from the spirit and scope of the invention as set forth in the following claims.

What is claimed is:

1. An aquatic trap, comprising:
    an oblong shaped chamber bounded by a netted periphery that is permeable by water;
    at least one inlet passing through said netted periphery, said inlet converging toward the interior of said chamber;

a rotatable wall portion formed in said netted periphery, said rotatable wall portion being connected to said netted periphery by a pivotal connection;

said rotatable wall portion being rotatable about said pivotal connection from a closed position in which said rotatable wall portion is substantially within the plane of said netted periphery to an open position in which said rotatable wall portion is substantially outside of the plane of said netted periphery;

biasing means for biasing said rotatable wall portion toward said closed position;

frame means extending about said chamber and supporting said netted periphery, said frame means comprising:
first and second end frames; and
a plurality of elongated side rods interconnecting said first and second end frames;

said rotatable wall portion comprising a rotatable door disposed adjacent to said first end frame;

said biasing means comprising:
a cantilevered beam member projecting outward beyond said netted periphery adjacent said first end frame; and
a spring member extending between said cantilevered beam member and said rotatable door; and stop means for abutting said rotatable door in said closed position against the biasing action of said biasing means, said stop member having at least one cross member disposed across said first end frame;

said chamber being substantially rectangular in cross section;

each of said first and second end frames being substantially rectangular;

said inlet being disposed within said rotatable door, said inlet comprising a substantially conical netted surface projecting toward the interior of said chamber therefrom.

2. An aquatic trap according to claim 1, wherein said aquatic trap additionally comprises a second inlet, said second inlet comprising a substantially circular loop formed in said second end frame and a substantially conical netted surface projection toward the interior of said chamber therefrom, and handle means for being grasped by an individual disposed on said netted periphery.

3. An aquatic trap, said aquatic trap comprising:
a chamber;
said chamber being bounded by a netted periphery that is permeable by water;
at least one inlet passing through said netted periphery, said inlet converging toward the interior of said chamber;
a rotatable wall portion formed in said netted periphery, said rotatable wall portion being connected to said netted periphery by a pivotal connection;

said rotatable wall portion being rotatable about said pivotal connection from a closed position in which said rotatable wall portion is substantially within the plane of said netted periphery to an open position in which said rotatable wall portion is substantially outside of the plane of said netted periphery;

biasing means for biasing said rotatable wall portion toward said closed position;

said chamber being oblong in shape;

frame means extending about said chamber and supporting said netted periphery;

said frame means comprising:
a pair of end frames; and
a plurality of elongated side rods interconnecting said pair of end frames;

said rotatable wall portion comprising a rotatable door positioned against one of said pair of end frames;

said biasing means comprising:
a cantilevered beam member projecting outward beyond said netted periphery adjacent said one end frame; and
a spring member extending between said cantilevered beam member and said rotatable door; and stop means for abutting said rotatable door in said closed position against the biasing action of said biasing means;

said chamber being substantially rectangular in cross section;

each of said pair of end flames being substantially rectangular;

said inlet being disposed within said rotatable door;

said inlet comprising a substantially circular loop formed in said rotatable door and a substantially conical netted surface projecting toward the interior of said chamber therefrom; and said stop means comprising a pair of cross members disposed across said rotatable door.

4. An aquatic trap according to claim 3, said aquatic trap additionally comprising a second inlet, said second inlet comprising a substantially circular loop formed in the other of said pair of end flames and a substantially conical netted surface projecting toward the interior of said chamber therefrom.

5. An aquatic trap according to claim 4, said aquatic trap additionally comprising handle means for being grasped by an individual provided on said netted periphery.

* * * * *